(12) United States Patent
Sampathkumar (10) Patent No.: US 7,831,750 B2
(45) Date of Patent: Nov. 9, 2010

(54) METHOD, APPARATUS AND SOFTWARE FOR PROCESSING INPUT OR OUTPUT REQUESTS FOR A MIRRORED STORAGE VOLUME

(75) Inventor: Kishore Kaniyar Sampathkumar, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 344 days.

(21) Appl. No.: 12/022,035

(22) Filed: Jan. 29, 2008

(65) Prior Publication Data

US 2008/0183922 A1    Jul. 31, 2008

(30) Foreign Application Priority Data

Jan. 31, 2007    (IN)    ............................ 209/CHE/2007

(51) Int. Cl.
*G06F 13/00*    (2006.01)
*G06F 3/00*    (2006.01)
(52) U.S. Cl. ........................ 710/59; 711/144; 710/61; 710/21; 714/2; 714/4
(58) Field of Classification Search ................. 711/162, 711/144, 168, 150; 710/21, 61; 714/2, 4, 714/6
See application file for complete search history.

(56) References Cited

U.S. PATENT DOCUMENTS

| | | | |
|---|---|---|---|
| 6,553,509 B1 * | 4/2003 | Hanson et al. ................. 714/5 |
| 7,370,235 B1 * | 5/2008 | Gulve et al. .................... 714/20 |
| 7,395,378 B1 * | 7/2008 | Pendharkar et al. ......... 711/144 |
| 7,707,372 B1 * | 4/2010 | Kumar et al. ................ 711/162 |
| 2005/0193272 A1 * | 9/2005 | Stager et al. ................... 714/42 |
| 2006/0271809 A1 * | 11/2006 | Ichikawa et al. ............... 714/2 |
| 2007/0022264 A1 * | 1/2007 | Bromling et al. ............ 711/162 |

OTHER PUBLICATIONS

P. M. Chen et al., "RAID: High-Performance, Reliable Secondary Storage," ACM Computing Surveys, vol. 26, No. 2, Jun. 1994, pp. 145-185.

* cited by examiner

*Primary Examiner*—Alford W Kindred
*Assistant Examiner*—Ernest Unelus (57) ABSTRACT

A method, apparatus and software is disclosed for processing input/output (I/O) requests for a mirrored storage volume in recovery mode in which the processing of normal I/O is optimised using the recovery map for the volume.

16 Claims, 8 Drawing Sheets

METHOD, APPARATUS AND SOFTWARE FOR PROCESSING INPUT OR OUTPUT REQUESTS FOR A MIRRORED STORAGE VOLUME

Related Applications

This patent application claims priority to Indian patent application serial no. 209/CHE/2007, titled "A Method, Apparatus and Software for Processing Input or Output Requests for a Mirrored Storage Volume", filed in India on 31 Jan. 2007, commonly assigned herewith, and hereby incorporated by reference.

BACKGROUND OF THE INVENTION

Computer storage systems often replicate the data they store to reduce the chances of data loss in the even of equipment failure. Storage volumes are replicated or mirrored and distributed over a number of physical storage devices. The storage volumes may be partitions of a physical device or logical volumes. The management of input and output requests to the mirrored volumes, is carried out by a mirror manager application program (MMAP). The MMAP is responsible for ensuring that the data consistency is maintained across the mirrored volumes in the event a system crash. Such a failure can lead to inconsistency of data particularly if a write request was issued prior to the failure but not completed. In this case, the data on one mirror may become inconsistent with the data on the other mirrors. Recovering from such a failure involves the re-synchronisation of the data held in the mirror volumes. Until all such mirror volumes are fully recovered by synchronisation, a system that makes intensive use of its storage will operate in a degraded mode.

In smaller systems involving few mirror volumes, the recovery is often performed sequentially, volume by volume. On larger systems involving many mirror volumes, the recovery of mirror volumes is scheduled in parallel. The total number of such parallel recovery operations is normally limited to ensure a reasonable response to applications that need to access or update the data on both recovered and un-recovered volumes. Due to these practical considerations, the degraded mode of I/O operation can extend over many hours. Consequently, the performance of normal I/Os issued by applications on such mirrored volumes during that time can suffer significantly.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS OF THE INVENTION

Figure 1:
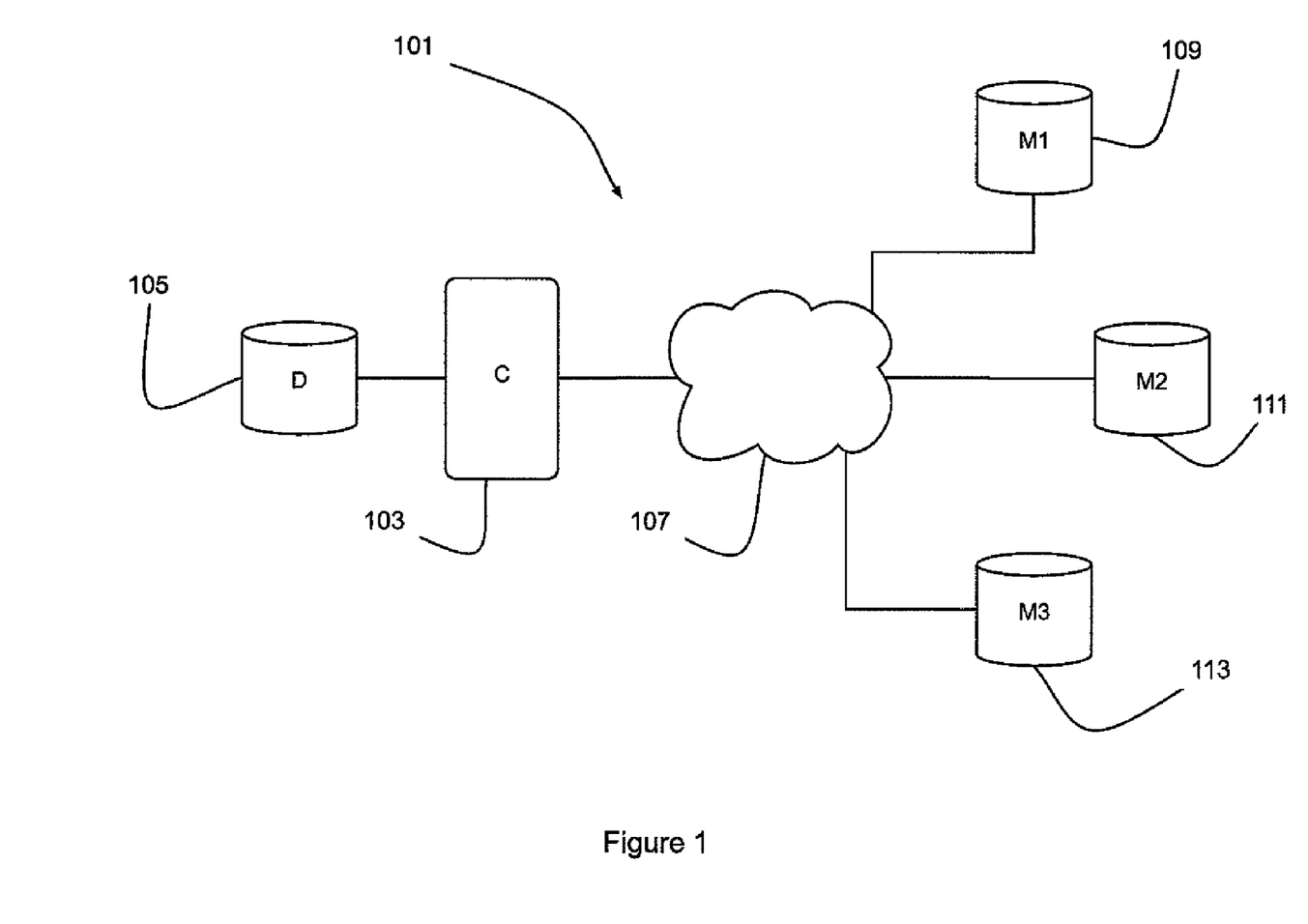
FIG. 1 is a schematic illustration of a computer system comprising a mirrored storage volume.
Figure 2:
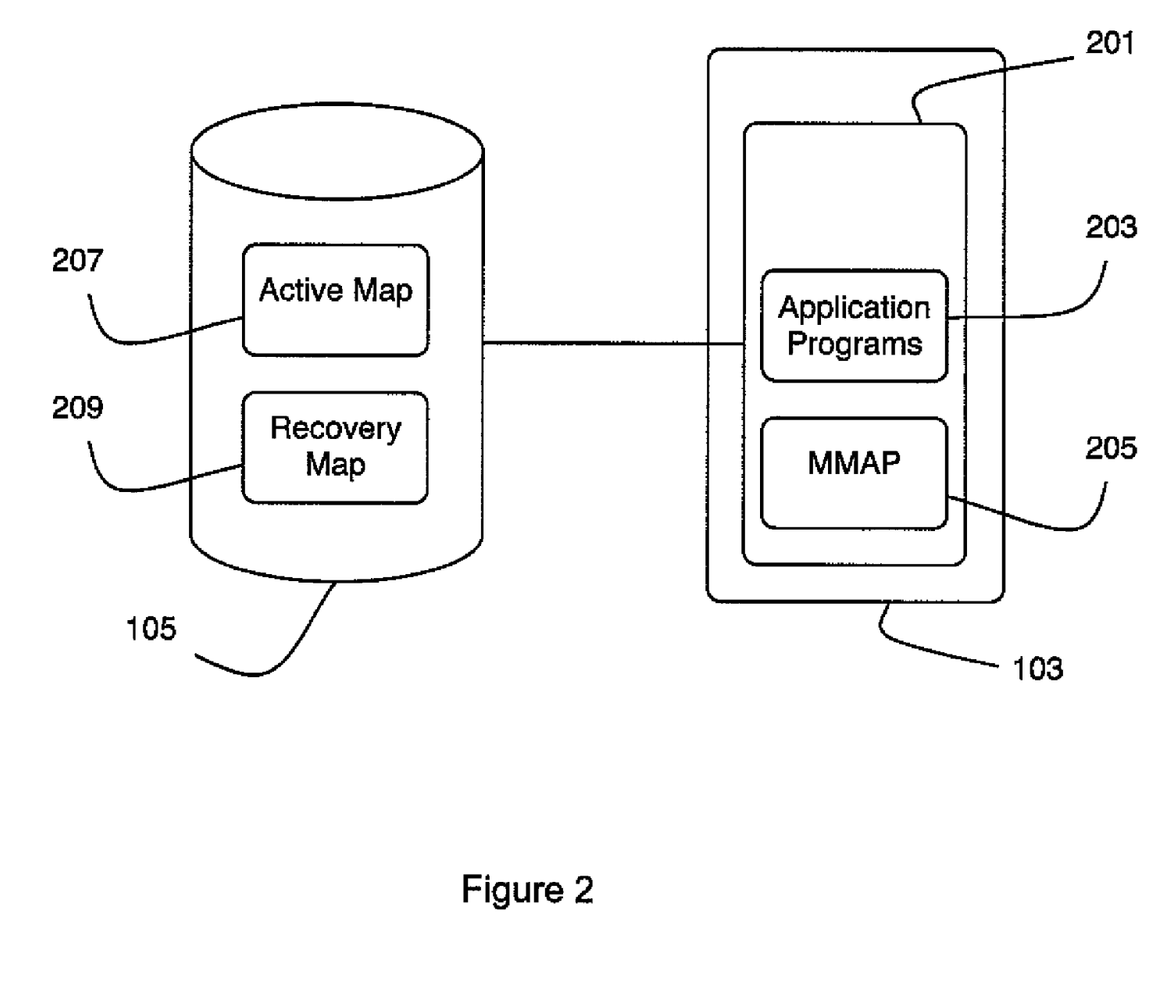
FIG. 2 is a schematic illustration of programs and data used in the system of FIG. 1.
Figure 3:
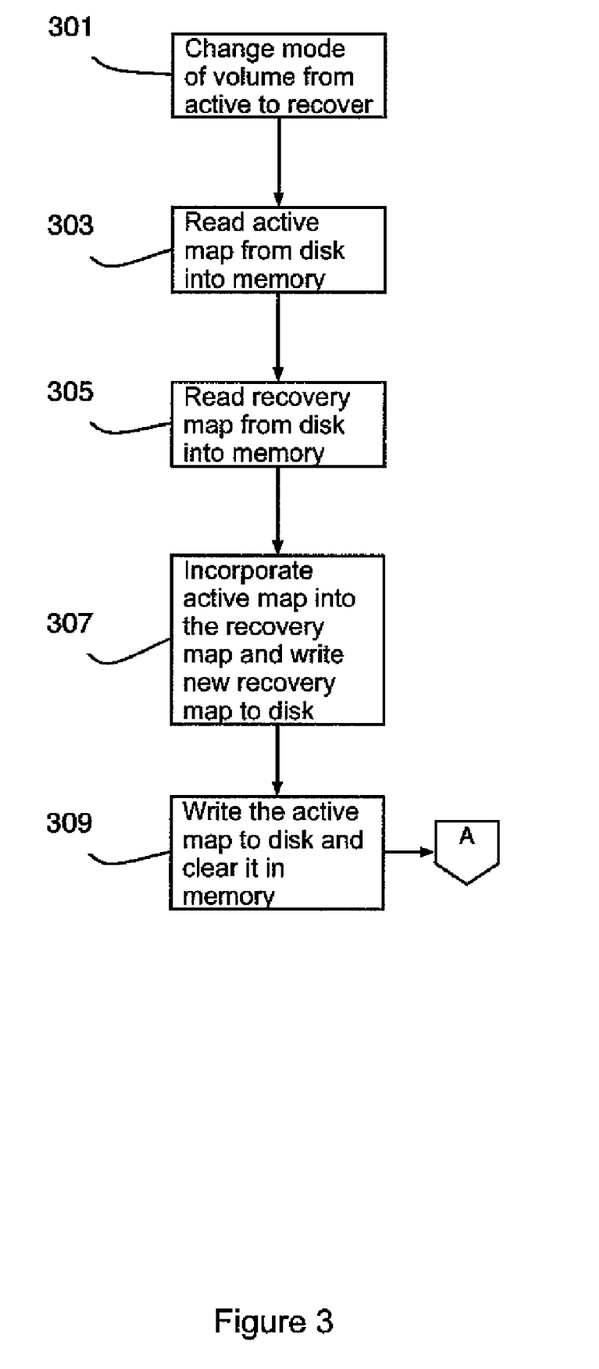
FIGS. 3 to 6 are flow charts illustrating the processing carried out in the computer system according to an embodiment of the invention.

With reference to FIG. 1, a computer system 101 comprises a computer (C) 103 attached to a storage device, in the form of a disk drive (D), that provides a storage volume 105. The computer 103 is also connected, via a network 107, to three further storage devices (M1, M2, M3) 109, 111, 113, which collectively provide a storage area network (SAN). The computer system is arranged to replicate or mirror data volume 105 on each of the three storage devices 109, 111, 113, which thus provide mirror volumes. With reference to FIG. 2, the computer 103 runs an operating system (OS) 201, which provides an execution environment for one or more application programs 203 and a mirror manager application program (MMAP) 205. The MMAP 205 is arranged to handle the setting up, use and consistency recovery processes for the mirrored storage volumes on behalf of the operating system 201. The mirroring performed by the MMAP 205 is transparent to the OS 201 and to users of the computer system 101.

The data stored on the storage volume 105 is accessed by application programs via read or write requests, also known as input or output (I/O) requests. I/O requests are issued to the OS 201 by the application program 203, which then passes the requests to the MMAP 205. In the case of read requests, the MMAP 205 is arranged to access the requested data on any one of the mirrored volumes that is active. In the case of a write request, the MMAP 205 is arranged to keep a record, in the form of an active map 207, of write requests, which are in progress at any given time. In other words the active map 207 is a record of write requests that have been initiated but which have not been completed. The active map 207 indicates the regions of the storage volume to which such write requests refer. The active map 207 is maintained in memory and written to storage 105 prior to the initiation of each new write request. Until the active map 207 has been successfully written to disk, any new write request is kept on hold. The new write request is not allowed to proceed in parallel with the active map being written to disk. When the storage volume 105 is active, any I/O write request issued on it will be issued on all of the mirror volumes on the storage devices 109, 111, 113. An I/O write request is treated as complete and thus removed from the active map 207 only after the data is written successfully to all the mirror volumes. I/O requests issued on the mirrored volume 105 in active mode are termed normal I/Os.

The active map 207 is used by the MMAP 205 in a recovery process triggered by a system crash. The recovery process is arranged to recover the integrity of the data in the storage volume, which may have been compromised as a result of the failure. This process is also referred to as the resynchronisation of a mirrored volume. The active map 207 provides a record of the regions of the storage volume for which writes were in progress at the time of the failure and thus which regions need to be resynchronised with data from another mirror volume. Regions for which there is a possibility of the data being inconsistent, because of an incomplete write request, are referred to as dirty.

When the recovery process is triggered, the MMAP 205 incorporates the active map 207 in memory into a recovery map 209 in memory, which is then written to disk. The active map 207 is then cleared and also written to disk. After this, normal I/Os can continue even with one of the mirror volumes in recovery mode, with any write requests being correspondingly logged in the active map 207 as noted above.

At any given time after their creation, the both active map 207 and recovery map 209 coexist in memory and on disk. While the system is up and operational, the maps in memory are consulted and maintained. The maps on disk are consulted only when the system boots-up and loads the maps into memory. If the system is cleanly shutdown, the maps in memory are written or flushed to disk, so that they are available when the system boots up. However, if the system crashes, then there can be a difference between the maps in memory and their counterparts on disk. In such a situation, the version on disk is used for the recovery process.

In recovery mode, in parallel with normal I/O processing and logging, the recovery process initialises a recovery index, which indicates the regions of the volume that are under recovery. Initially, the whole volume is under recovery. The recovery process then proceeds to issue read requests on the regions under recovery as indicated by the recovery index. For each region marked as dirty in the recovery map 209, a read request is performed from a corresponding region of one of the active mirror volumes. The dirty region is then resynchronized by writing the data to all of the mirrors in the mirror volume under recovery. After each such write request is completed, the recovery index is advanced to point beyond the region just recovered. Read requests for a volume in recovery mode take longer to complete than those on active volumes and are referred to as recovery I/Os. The recovery process is completed when all of the dirty regions in the recovery map 209 have been resynchronised. If a further failure of the volume being recovered occurs before the recovery process is complete, the current active map is incorporated into the recovery map, which thus becomes a cumulative record of dirty regions.

Processing normal I/O read requests in the present embodiment involves first consulting the recovery index to determine whether or not the regions to which the I/O request refers are within the part of the volume under recovery. In other words, is the I/O request block offset plus the I/O length less than or equal to the recovery index value. If so, the request will be considered a normal I/O request. However, for I/O requests in the region that is not yet recovered, that is, where the I/O block offset plus I/O length is higher than the recovery index value, the recovery map 209 is consulted to determine if the I/O request relates to one or more of the regions marked as dirty. If the I/O request range does not relate to any dirty regions then the request can be processed as a normal I/O request as opposed to a recovery I/O request. If, however, the I/O request relates one or more dirty regions then it will be processed as a recovery I/O request.

The active map 207 and the recovery map 209 are each represented as binary numbers in which each bit position represents a region of the storage volume 105 and the value of the bit indicates whether or not the given region is dirty. The active map 207 can be seen as a set A:

$$A=\{a[1], a[2], \ldots a[M]\}$$

where $|A|<=N$ and $M<=N$, $|A|$ represents the number of elements in set A and $a[1]$ to $a[M]$ are unique integer values representing the actual bit positions set in the active map 207 which correspond to dirty regions of the storage volume 105. The value of N determines the maximum number of concurrently active writes that can be tracked for the mirrored volume for a possible recovery of the mirrored volume after a system crash. In other words, N represents an upper bound for the amount of data recovery that may be performed in a mirrored volume, should the system crash. N is configured so that the amount of data recovery is manageable within the performance constraints of the system. For example, a larger value of N results in a longer recovery process and a smaller time saving over a system that does not utilize an active map. If N is small, then the number of concurrent writes that can be tracked is small. If the active map becomes full, that is $|A|=N$, then before the next concurrent write can proceed, an active concurrent write must be completed thus clearing a bit number in the active map, thus slowing the I/O process for the volume.

For each region in the active map 207, two further pieces of data are maintained. The first piece of data is a busy condition for each region. The busy condition is a variable, which acts as a counter. Each time a write request is initiated for a region, the busy counter for that region is incremented. Conversely, each time a write request is successfully completed, the relevant busy counter is decremented. The second piece of data is a time stamp, which is updated each time the corresponding region in the active map 207 is written to.

As noted above, when an I/O write request is complete, that is the data has been written successfully to all the mirror volumes, it is removed from the active map 207. However, in some cases where large numbers of I/O write request remain in progress, the active map may be full ($|A|=N$) when a new member needs to be added to the active map 207. In this case, prior to the addition of the new member, an existing member is removed by a region replacement process, which uses the busy conditions and time stamps recorded for each region. The region replacement process selects the least recently used (LRU) region, which is not currently busy. In other words, the candidate region for replacement is the region with the oldest time stamp and a busy counter of zero. If the region with the oldest time stamp is defined as busy, that is a nonzero busy counter, then the region replacement process will block processing of the new write request and thus the addition of the new region to the active map 207 until the replacement candidate ceases to be busy. Regular triggering of the region replacement process is an indication that the value of N may need to be reconfigured to a higher value to enable more efficient operation of the system.

The processing carried out by the MMAP 205 during the recovery of the mirrored storage volume 105 will now described in further detail with reference to the flow charts of FIGS. 3 to 6. On system start-up, after determining that the mirrored storage volume 105 needs recovery, the mode of the mirrored volume is changed from active to recover at step 301 in FIG. 3. Processing then moves to step 303 where the active map 207 for the volume is read from disk into memory. Processing then moves to step 305 where the recovery map 209 is read from disk into memory. At step 307, the active map 207 is incorporated into the recovery map 209 in memory and the new or updated recovery map is written to disk while also being maintained in memory. Processing then moves to step 309 where the active map in memory is cleared and then written to disk while also being maintained in memory. The mirrored volume is now available for use and the recovery process starts the resynchronisation of the mirrored volume as a background process.

Figure 4:
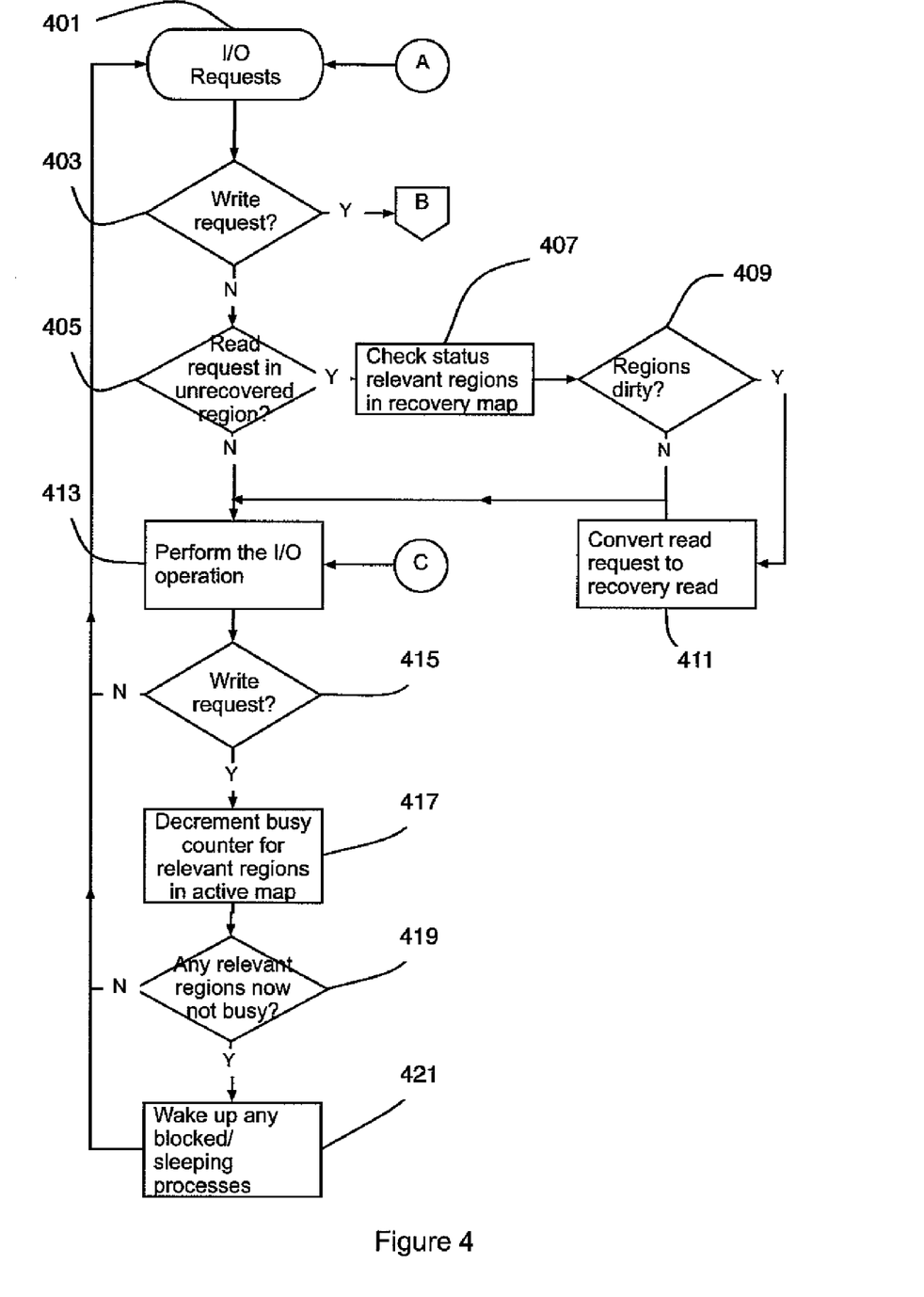

Processing then moves to step 401 of FIG. 4 where an I/O request is awaited. When a request is received by the MMAP 205, processing moves to step 403. If the I/O request is a write request, then processing moves to step 501 of FIG. 5 where the process of logging the write request in the active map and updating the appropriate busy counter is performed as described in further detail below. If the I/O request is a read request then processing moves to step 405. At step 405 the I/O block offset and I/O length are compared to the recovery index and if this indicates that the read request falls within the part of the volume not yet recovered, then processing moves to step 407 where the recovery map is inspected to determine if any of the regions to which the read request applies are marked as dirty. Processing then moves to step 409 where if the read request applies to any regions that are dirty, processing moves to step 411. At step 411, the read request is designated as a recovery read request as described above. If at step 409 it is determined that the read request refers to only non-dirty regions in the recovery map then processing moves to step 413 with the read request designated as a normal read request as described above. Similarly, if at step 405 the recovery index indicates that the read request falls within the part of the volume that has been recovered then processing moves to step 413 with the read request designated as a normal read request.

At step 413, the I/O request is performed and may be a normal or recovery read request or a write request. Processing then moves to step 415 where if the request was a read request processing returns to step 401 to await a further I/O request as described above. If the I/O request was a write request then processing moves to step 417. At step 417, the busy counter is decrement by one for the entries in the active map 205 corresponding to regions involved in the completed write request. Processing then moves to step 419 where if all of the regions involved in the write request remain busy, that is their busy counter is non zero, then processing returns to step 401 as described above. If however, any of the regions involved in the write request have now become not busy, that is their busy counter is zero, then, for each such region, processing moves to step 421. At step 421, if there are processes that are blocked or sleeping, waiting for a region to become not busy then these processes are restarted. Blocked and waiting processes are described in further detail below with reference to FIG. 5. From step 421, processing returns to step 401 as described above.

Figure 5:
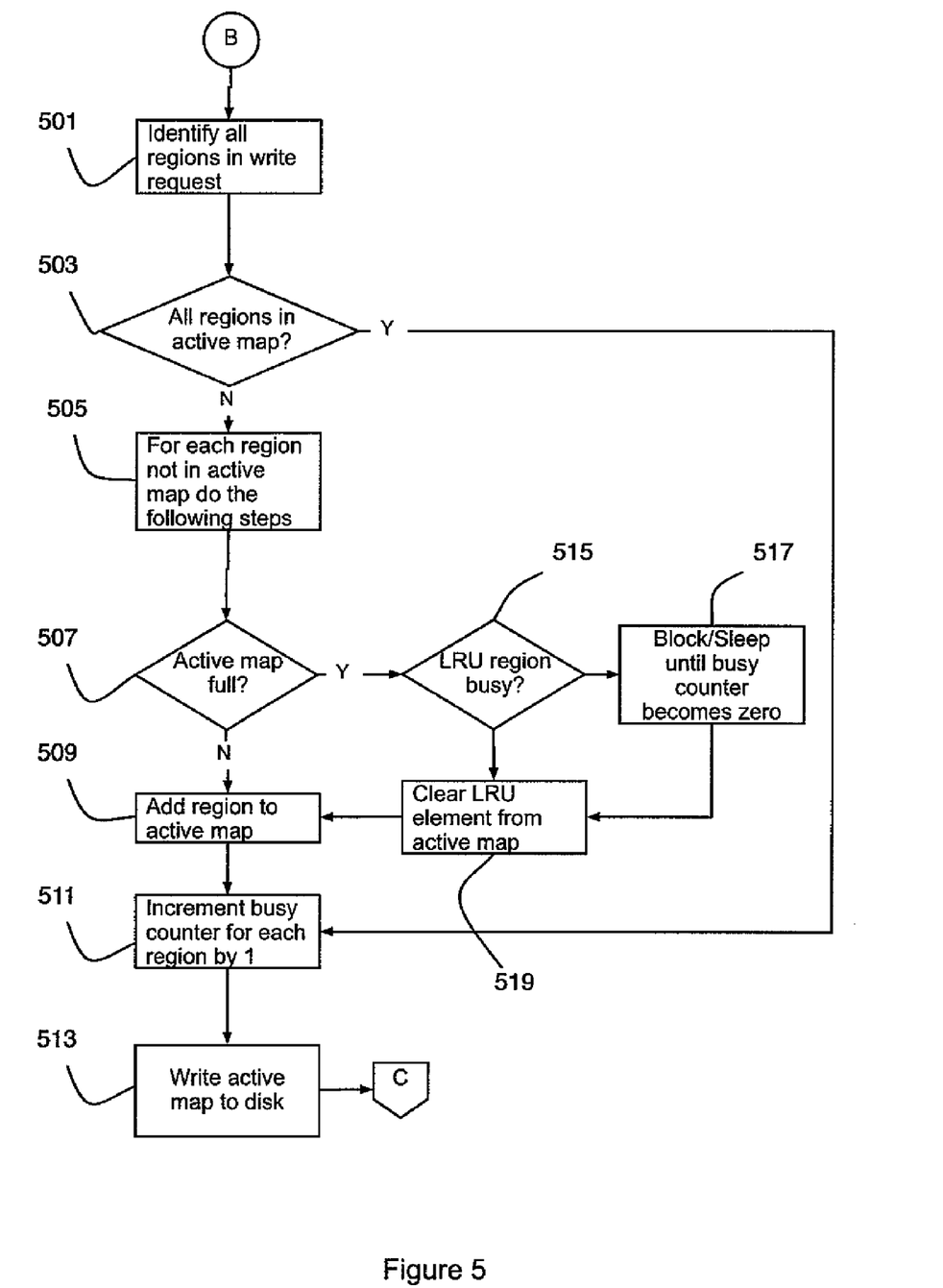

As noted above, if at step 403, the I/O request is a write request then processing moves to step 501 of FIG. 5. At step 501, all the regions covered by the write request are identified and processing moves to step 503. At step 503 if all of the identified regions are already marked as dirty in the active map 205 then processing moves to step 511 and continues as described below. If at step 503 one or more of the identified regions are not already marked as dirty in the active map 205 then processing moves to step 505 from where each of the subsequent steps 507 to 519 are carried out for each region not in the active map 205.

At step 507, the active map 205 is inspected to determine if it is full and if not processing moves to step 509 where the region is marked in the active map as dirty. Processing then moves to step 511 where the busy counter for the region is incremented and processing moves to step 513. At step 513, the active map 205 is written to disk prior to the initiation of the write request and if all the regions for the write request have been processed, processing returns to step 413 of FIG. 4.

If at step 507 it is determined that the active map is full then processing moves to step 515 where the least recently used (LRU) region in the active map is identified. If the LRU region is marked as busy then processing moves to step 517 where the process is blocked or put into a sleep mode until the LRU region becomes free. As soon as the LRU region becomes free, triggered by the processing in step 421 of FIG. 4, processing continues to step 519. Similarly, if at step 515 the LRU region was not busy, processing moves to step 519. At step 519, the LRU region is cleared from the active map 205 and processing moves to step 509 and continues as described above.

Figure 6:
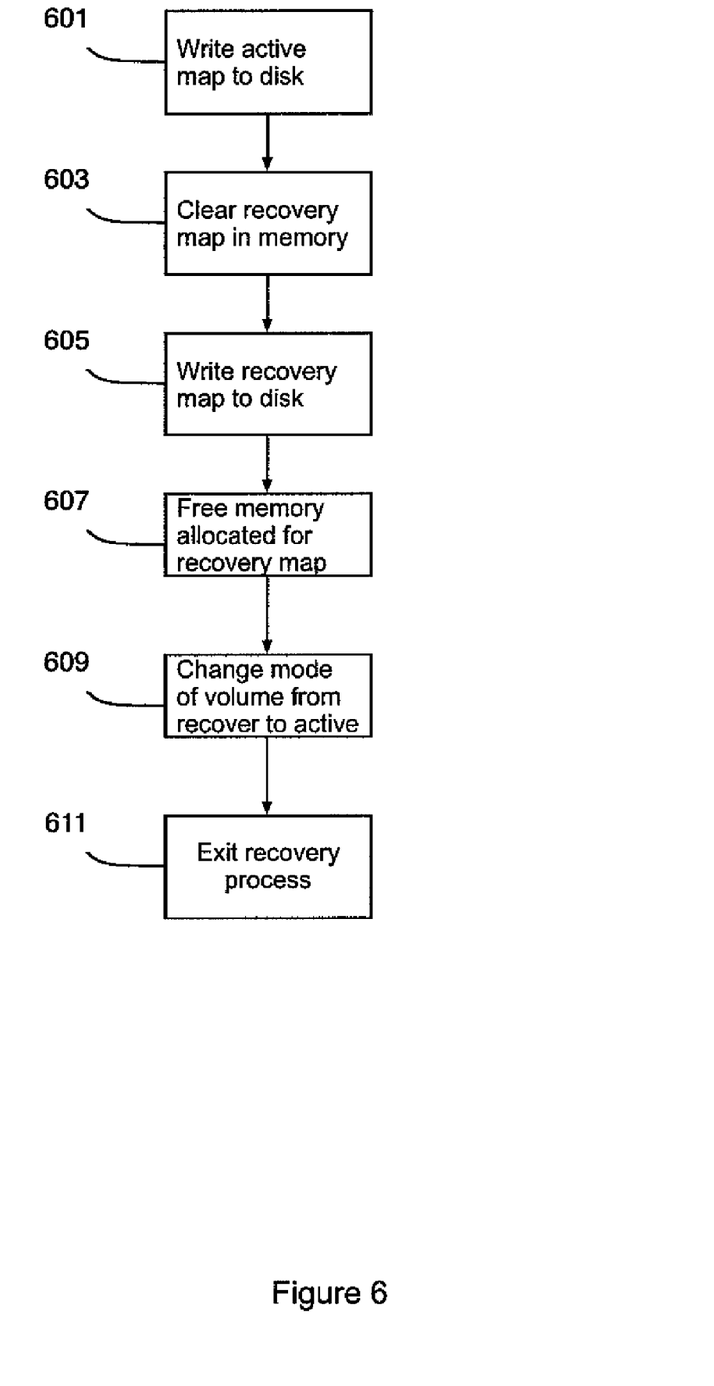

Once the recovery process has completed its processing of the mirrored volume 105 a procedure, outlined in FIG. 6, is invoked to clear the recovery map and then exit. At step 601, the active map 205 is written to disk and then at step 603 the recovery map 207 is cleared. Processing then moves to step 605 where the cleared recovery map is written to disk and at step 607 the memory allocated to the recovery map is freed. Processing then moves to step 609 where the mode of the mirrored volume is changed from recovery to active and then at step 611 the recovery procedure completes and exits. The above steps are required to ensure that any outstanding dirty bits in the active map in memory that had corresponding entries in the recovery map are guaranteed to be present in the copy of the active map on disk prior to the recovery map being cleared.

In another embodiment, the processing of normal write requests involves consulting and exploiting any overlaps between the regions to which the write request applies and those marked for recovery in the recovery map. The I/O range involved in the write request is checked against the recovery map to determine if the I/O range covers any of the regions marked for recovery. If so, the corresponding dirty region bits are not written to the active map on disk. The set up and termination of the recovery procedure described above with reference to FIGS. 3 and 6 remains the same. However, the processing of read requests as described above with reference to FIG. 4 is simplified and further steps are added to the processing of write requests as described above with reference to FIG. 5. The modified processing of the present embodiment is described below with reference to FIGS. 7 and 8.

Figure 7:
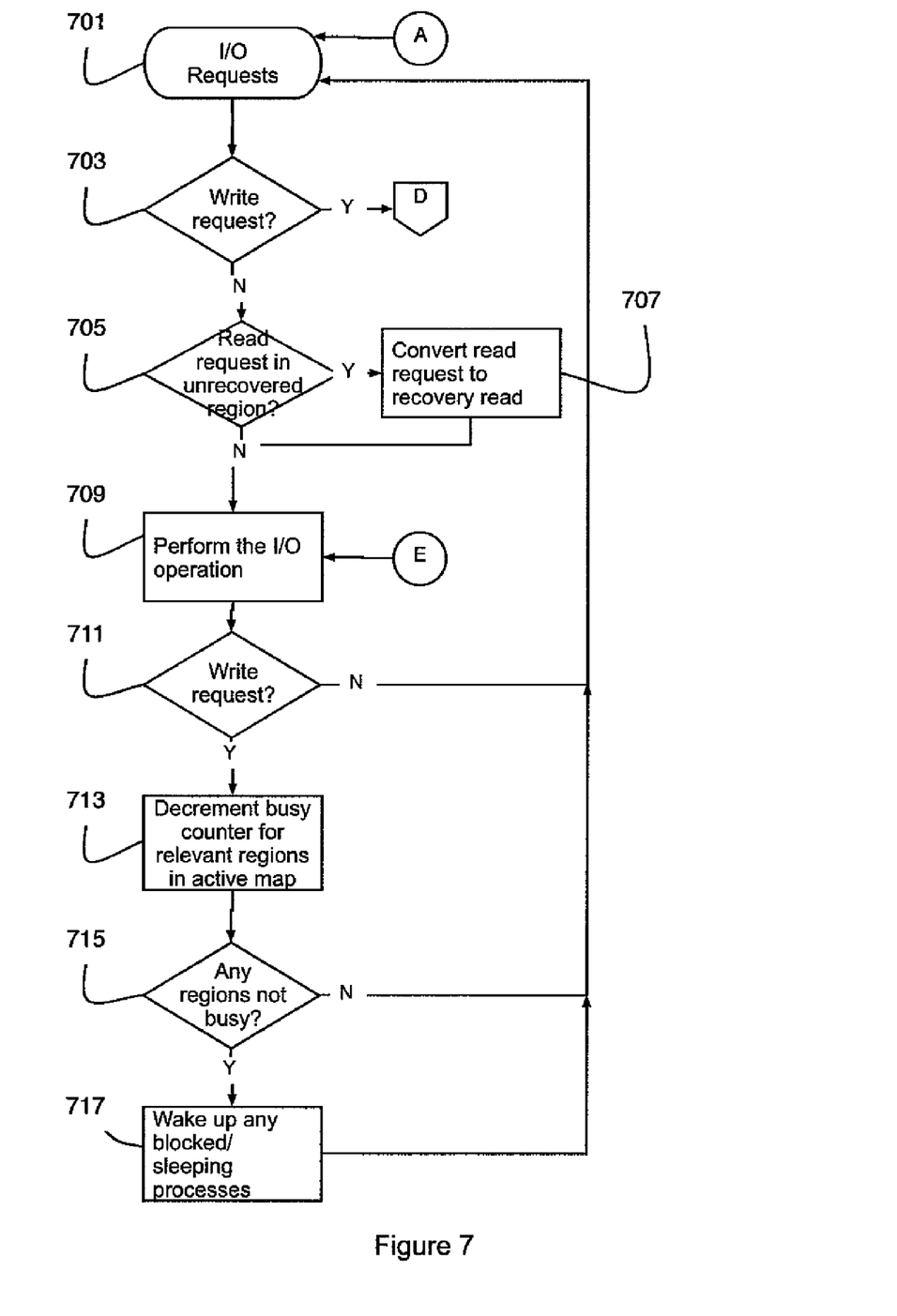
FIGS. 7 and 8 are flow charts illustrating the processing carried out in the computer system according to another embodiment of the invention.

With reference to FIG. 7, at step 701 an I/O request is awaited. When a request is received by the MMAP 205, processing moves to step 703. If the I/O request is a write request, then processing moves to step 801 of FIG. 8 where the process of logging the write request in the active map and updating the busy counter is performed as described in further detail below. If the I/O request is a read request then processing moves to step 705. At step 705 the I/O block offset and I/O length are compared to the recovery index and if this indicates that the read request falls within the part of the volume not yet recovered then processing moves to step 707 where the read request is designated as a recovery read request as described above and processing moves to step 709. If at step 705 it is determined that the read request refers to only recovered regions then processing moves to step 709 with the read request designated as a normal read request as described above.

At step 709, the I/O request is performed and may be a normal or recovery read request or a write request. Processing then moves to step 711 where if the request was a read request processing returns to step 701 to await a further I/O request as described above. If the I/O request was a write request then processing moves to step 713. At step 713, the respective busy counters are decremented for the entries in the active map 205 corresponding to regions involved in the completed write request. Processing then moves to step 715 where if all of the regions involved in he write request remain busy, that is their busy counters are non-zero, then processing returns to step 701 as described above. If, however, any of the regions involved in the write request have now become not busy, that is their busy counter is zero, then, for each such region, processing moves to step 717. At step 717, if there are processes that are blocked or sleeping, waiting for a region to become not busy then these processes are woken up. Blocked and waiting processes are described in further detail below with reference to FIG. 8. From step 717, processing returns to step 701 as described above.

Figure 8:
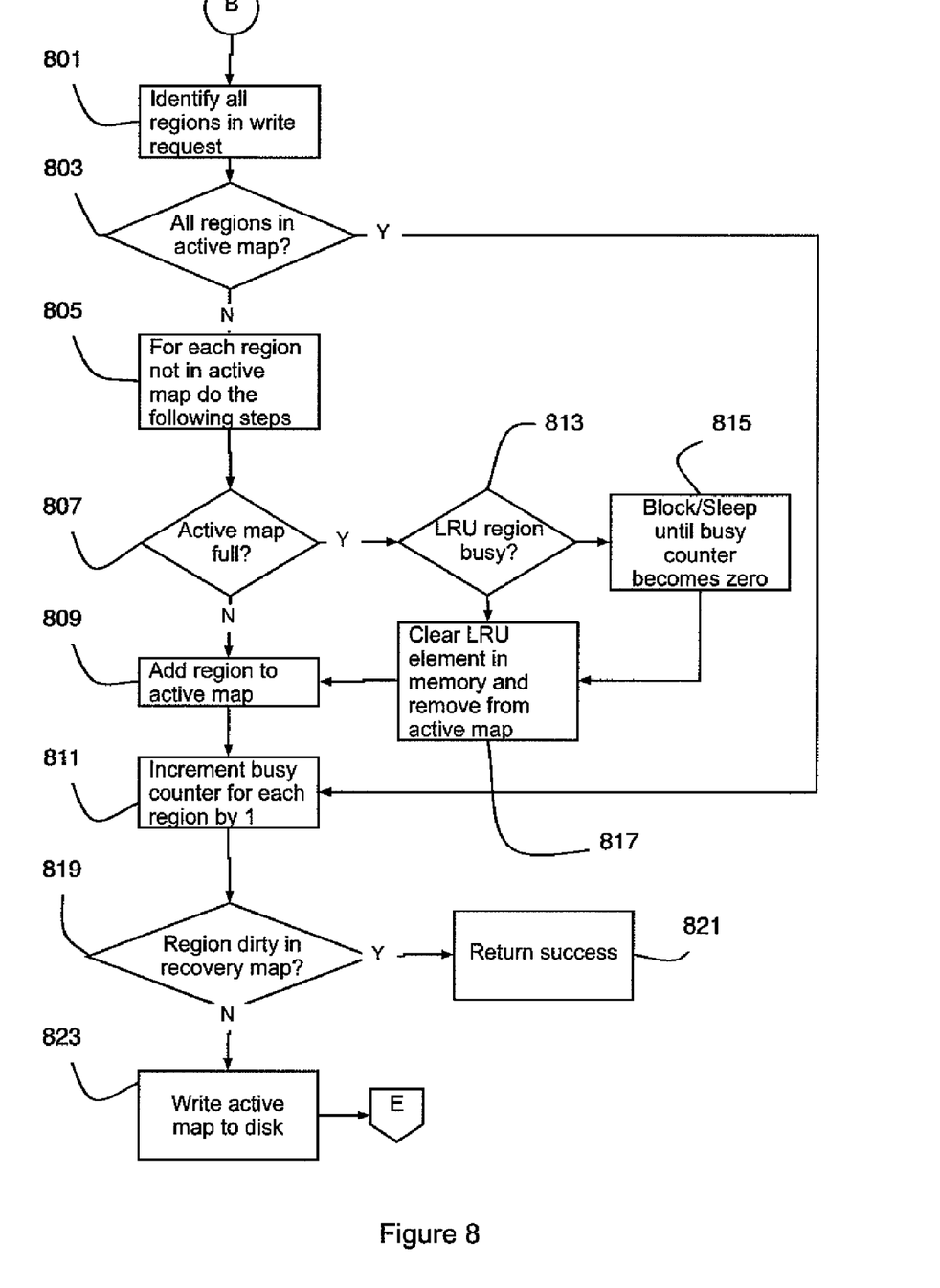

As noted above, if at step 703, the I/O request is a write request then processing moves to step 801 of FIG. 8. At step 801, all the regions covered by the write request are identified and processing moves to step 803. At step 803 if all of the identified regions are already marked as dirty in the active map 205 then processing moves to step 811 and continues as described below. If at step 803 one or more of the identified regions are not already marked as dirty in the active map 205 then processing moves to step 805 from where each of the subsequent steps 807 to 823 are carried out for each region not in the active map 205.

At step 807, the active map 205 is inspected to determine if it is full, and if not processing moves to step 809. If at step 807 it is determined that the active map is full then processing moves to step 813 where the least recently used (LRU) region in the active map is identified. If the LRU region is marked as busy then processing moves to step 815 where the process is blocked or put into a sleep mode until the LRU region becomes free. As soon as the LRU region becomes free, triggered by the processing in step 709 of FIG. 7, processing continues to step 817. Similarly, if at step 813 the LRU region was not busy, processing moves to step 817. At step 817, the LRU region is cleared from the active map 205 and processing moves to step 809.

At step 809, each region is marked in the active map as dirty before processing moves to step 811 where the busy counter for each region is incremented and processing moves to step 819. At step 819, the recovery map 209 is inspected to determine if the region currently being processed is marked as dirty and if so, processing moves to step 821 where the processing of that region is complete and processing returns to handle any further regions for that write request from step 807. If at step 819 it is determined that the region currently being processed is not marked as dirty then processing moves to step 823 where the active map is written to disk prior to the initiation of the write request and if all the regions for the write request have been processed, processing returns to step 709 of FIG. 7.

In the above embodiments, N is the maximum number of bits that can be dirty in the active map so as to ensure that the condition |A|<=N. In a further embodiment, this restriction is limited to only the copy of the active map in memory. The copy of the active map on disk is allowed to have dirty bits such that |A|>N. This is possible since there is no problem with the consistency of the data if a region that is already synchronised and hence clean is marked as dirty on disk. This will at most result in re-synchronising data that is already synchronised. This optimisation can be used if it is known that the active map will be flushed to disk within a reasonably short period of time.

Embodiments of the invention exploit the recovery map to optimise the performance of processing normal I/Os issued in parallel on un-recovered mirrored volumes, before and during the mirror consistency recovery. This is achieved by maintaining the recovery map in memory. This map is then used to perform intelligent processing of normal I/O requests issued on such mirrored volumes. The recovery map is maintained in kernel space memory rather than user space memory so that it is accessible to I/O requests from all processes. This intelligent processing reduces the effect of the degraded mode of I/O read operations for read requests issued on regions that are not identified as dirty in the recovery map. This processing also reduces the need to write dirty logs and clear logs to disk corresponding to I/O write operations on regions already marked for recovery in the recovery map on disk.

It will be understood by those skilled in the art that the apparatus that embodies a part or all of the present invention may be a general purpose device having software arranged to provide a part or all of an embodiment of the invention. The device could be single device or a group of devices and the software could be a single program or a set of programs. Furthermore, any or all of the software used to implement the invention can be communicated via any suitable means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method for processing input/output (I/O) requests for a mirrored storage volume in recovery mode, said method comprising the steps of:
    a) accessing a recovery map arranged to indicate each region of a mirrored volume for which one or more prior I/O requests were in progress but incomplete prior to said mirrored volume being placed in recovery mode;
    b) receiving a further I/O request for one or more regions of said mirrored volume in recovery mode;
    c) determining whether one or more of said regions is within a part of said mirrored volume not yet recovered;
    d) determining whether one or more of said regions is marked as dirty in said recovery map for said mirrored volume;
    e) if one or more of said regions is within a part of said mirrored volume not yet recovered and none of said regions is marked as dirty in said recovery map then processing said further I/O request as a normal I/O request;
    f) based on one or more of said regions being within a part of said mirrored volume not yet recovered and not marked as dirty in said recovery map, recording the one or more regions in an active map for said volume and writing said active map to storage prior to initiating said write request; and
    g) when one or more of said regions corresponding to said write request is marked as dirty in said recovery map then the step of writing said active map to disk is omitted;
    wherein said recovery mode recovers the mirrored storage volume from a failure and during said recovery mode, said mirrored volume is synchronized.

2. A method according to claim 1 in which said further I/O request is a read request.

3. A method according to claim 2 in which if one or more of said regions is within a part of said mirrored volume not yet recovered and any of said regions is marked as dirty in said recovery map then converting said read request to a recovery read request.

4. A method according to claim 1 in which said further I/O request is a write request.

5. A method for processing write requests for a mirrored storage volume in recovery mode, said method of comprising the steps of:
- a) accessing a recovery map arranged to indicate each region of a mirrored volume for which one or more prior I/O requests were in progress but incomplete prior to said mirrored volume being placed in recovery mode;
- b) receiving a write request for a region of said mirrored volume in recovery mode;
- c) determining whether said region is within a part of said mirrored volume not yet recovered;
- d) determining whether said region is marked as dirty in said recovery map for said mirrored volume; and
- e) if said region is within a part of said mirrored volume not yet recovered and not marked as dirty in said recovery map then:
  - i) recording said region in an active map for said volume; and
  - ii) writing said active map to storage prior to initiating said write request; and
- f) if said region is within a part of said mirrored volume not yet recovered and marked as dirty in said recovery map then omitting the step of writing said active map to storage prior to initiating said write request;
wherein said recovery mode recovers the mirrored storage volume from a failure and during said recovery mode, said mirrored volume is synchronized.

6. A method according to claim 5 in which said recovery map is a cumulative record of regions of said volume for which write requests have failed to complete.

7. A method according to claim 5 carried out by a mirror management application program.

8. Apparatus for processing input/output (I/O) requests for a mirrored storage volume in recovery mode, said apparatus being operable to:
- access a recovery map arranged to indicate each region of a mirrored volume for which one or more prior I/O requests are incomplete prior to said mirrored volume being placed in recovery mode;
- receive a further I/O request for one or more regions of said mirrored volume in recovery mode;
- determine whether one or more of said regions is within a part of said mirrored volume not yet recovered;
- determine whether one or more of said regions is marked as dirty in said recovery map for said mirrored volume;
- if one or more of said regions is within a part of said mirrored volume not yet recovered and none of said regions is marked as dirty in said recovery map then to process said further I/O request as a normal I/O request;
- if one or more of said regions is within a part of said mirrored volume not yet recovered and not marked as dirty in said recovery map, to then record the or each region in an active map an not marked as dirty in said recovery map, to then record the or each region in an active map for said volume and write said active map to storage prior to initiating said write request; and
- if one or more of said regions corresponding to said write request is marked as dirty in said recovery map then the said active map is not written to disk;
wherein said recovery mode recovers the mirrored storage volume from a failure and during said recovery mode, said mirrored volume is synchronized.

9. Apparatus according to claim 8 in which said further I/O request is a read request.

10. Apparatus according to claim 9 in which said apparatus is further operable, if one or more of said regions is within a part of said mirrored volume not yet recovered and any of said regions is marked as dirty in said recovery map, to then process said read request as a recovery read request.

11. Apparatus according to claim 7 in which said further I/O request is a write request.

12. Apparatus for processing write requests for a mirrored storage volume in recovery mode, said apparatus being operable to: access a recovery map arranged to indicate each region of a mirrored volume for which one or more prior I/O requests were in progress but incomplete prior to said mirrored volume being placed in recovery mode;
- receive a write request for a region of said mirrored volume in recovery mode;
- determine whether said region is within a part of said mirrored volume not yet recovered;
- determine whether said region is marked as dirty in said recovery map for said mirrored volume; and
- if said region is within a part of said mirrored volume not yet recovered and not marked as dirty in said recovery map then:
  - record said region in an active map for said volume; and
  - write said active map to storage prior to initiating said write request; and
- if said region is within a part of said mirrored volume not yet recovered and marked as dirty in said recovery map then omitting the writing of said active map to storage prior to initiating said write request;
wherein said recovery mode recovers the mirrored storage volume from a failure and during said recovery mode, said mirrored volume is synchronized.

13. Apparatus according to claim 8 in which said recovery map is a cumulative record of regions of said volume for which write requests have failed to complete.

14. Apparatus according to claim 8 carried out by a mirror management application program.

15. A computer program product for processing input/output requests for a mirrored storage volume the computer program product comprising storage medium readable by a processing circuit and storing instruction for execution by a processing circuit for performing a method comprising the step of:
- a) accessing a recovery map arranged to indicate each region of a mirrored volume for which one or more prior I/O requests were in progress but incomplete prior to said mirrored volume being placed in recovery mode;
- b) receiving a further I/O request for one or more regions of said mirrored volume in recovery mode;
- c) determining whether one or more of said regions is within a part of said mirrored volume not yet recovered;
- d) determining whether one or more of said regions is marked as dirty in said recovery map for said mirrored volume; and e) if one or more of said regions is within a part of said mirrored volume not yet recovered and none of said regions is marked as dirty in said recovery map then processing said further I/O request as a normal I/O request;
- f) based on one or more of said regions being within a part of said mirrored volume not yet recovered and not marked as dirty in said recovery map, recording the one or more regions in an active map for said volume and writing said active map to storage prior to initiating said write request; and
- g) when one or more of said regions corresponding to said write request is marked as dirty in said recovery map then the step of writing said active map to disk is omitted;

wherein said recovery mode recovers the mirrored storage volume from a failure and during said recovery mode, said mirrored volume is synchronized.

16. A method, comprising:

during a recovery process of a mirrored storage volume, merging contents of an active map into a recovery map, said active map indicates write requests that are in progress, but not yet completed;

during the recovery process, clearing the active map;

during the recovery process, initiating a write request to the mirrored storage volume, said write request targeting a region of said mirrored storage volume;

during the recovery process, updating an active map upon initiating said write request;

during the recovery process and upon updating said active map, writing said active map to disk when said region targeted by the initiated write request is not identified in the recovery map; and during the recovery process and upon updating said active map, precluding said active map from being written to disk when said region targeted by the initiated write request is identified in the recovery map.

* * * * *

UNITED STATES PATENT AND TRADEMARK OFFICE
CERTIFICATE OF CORRECTION

| | | |
|---|---|---|
| PATENT NO. | : 7,831,750 B2 | Page 1 of 1 |
| APPLICATION NO. | : 12/022035 | |
| DATED | : November 9, 2010 | |
| INVENTOR(S) | : Kishore Kaniyar Sampathkumar | |

It is certified that error appears in the above-identified patent and that said Letters Patent is hereby corrected as shown below:

In column 9, lines 53-55, in Claim 8, after "map" delete "an not marked as dirty in said recovery map, to then record the or each region in an active map".

In column 10, lines 51-57, in Claim 15, delete "d) determining whether one or more of said regions is marked as dirty in said recovery map for said mirrored volume; and e) if one or more of said regions is within a part of said mirrored volume not yet recovered and none of said regions is marked as dirty in said recovery map then processing said further I/O request as a normal I/O request;" and insert -- d) determining whether one or more of said regions is marked as dirty in said recovery map for said mirrored volume; and e) if one or more of said regions is within a part of said mirrored volume not yet recovered and none of said regions is marked as dirty in said recovery map then processing said further I/O request as a normal I/O request; --, therefor.

Signed and Sealed this
Fifth Day of April, 2011

David J. Kappos
*Director of the United States Patent and Trademark Office*